United States Patent
Kai et al.

(10) Patent No.: US 11,557,956 B2
(45) Date of Patent: Jan. 17, 2023

(54) POWER CONVERSION DEVICE AND METHOD FOR CONVERTING POWER FROM A POWER SUPPLY

(71) Applicant: NISSAN MOTOR CO., LTD., Yokohama (JP)

(72) Inventors: Toshihiro Kai, Kanagawa (JP); Kousuke Saito, Kanagawa (JP); Giorgio Lovison, Kanagawa (JP); Keisuke Inoue, Kanagawa (JP); Shigeharu Yamagami, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/626,210

(22) PCT Filed: Jul. 12, 2019

(86) PCT No.: PCT/IB2019/000701
§ 371 (c)(1),
(2) Date: Jan. 11, 2022

(87) PCT Pub. No.: WO2021/009532
PCT Pub. Date: Jan. 21, 2021

(65) Prior Publication Data
US 2022/0247302 A1    Aug. 4, 2022

(51) Int. Cl.
*H02M 1/00* (2006.01)
*H02M 3/156* (2006.01)

(52) U.S. Cl.
CPC ......... *H02M 1/0058* (2021.05); *H02M 3/156* (2013.01)

(58) Field of Classification Search
None
See application file for complete search history.

(56) References Cited

U.S. PATENT DOCUMENTS

| | | | |
|---|---|---|---|
| 7,110,269 B2* | 9/2006 | Cao | H05B 41/2856 |
| | | | 315/225 |
| 8,406,014 B2 | 3/2013 | Liu et al. | |
| 9,843,199 B2* | 12/2017 | Bosshard | H02J 5/005 |
| 10,110,071 B2* | 10/2018 | Akuzawa | H02J 50/12 |
| 10,135,348 B2* | 11/2018 | Hsiao | H02M 3/33546 |
| 2015/0236599 A1* | 8/2015 | Park | H02M 3/33507 |
| | | | 363/21.17 |
| 2017/0279312 A1 | 9/2017 | Akuzawa et al. | |

FOREIGN PATENT DOCUMENTS

| | | |
|---|---|---|
| CN | 1992493 A | 7/2007 |
| CN | 103547051 A | 1/2014 |
| EP | 1 973 220 A | 9/2008 |
| JP | 2007-68349 A | 3/2007 |
| JP | 2015-156791 A | 8/2015 |
| JP | 5832702 B1 | 12/2015 |

* cited by examiner

Primary Examiner — Jeffrey A Gblende
(74) Attorney, Agent, or Firm — Foley & Lardner LLP

(57) ABSTRACT

A method for controlling a power conversion device for converting power from a power supply by controlling an input to a resonance circuit comprising a resonance coil and a resonance capacitor, with a switching element, the method comprising simultaneously changing a switching frequency and a time ratio of the switching element so that the switching element satisfies a condition of zero-voltage switching when an output power of the power conversion device is changed.

7 Claims, 9 Drawing Sheets

POWER CONVERSION DEVICE AND METHOD FOR CONVERTING POWER FROM A POWER SUPPLY

TECHNICAL FIELD

The present invention relates to a power conversion device converting power from a power supply by controlling an input to a resonance circuit comprising a resonance coil and a resonance capacitor, with a switching element, and its control method.

BACKGROUND ART

Patent Literature 1 discloses a resonance-type power transmission apparatus as a power conversion device using a class-E circuit. The resonance-type power transmission apparatus disclosed in Patent Literature 1 includes multiple class-E circuits, in which a phase difference in current outputs from these class-E circuits is adjusted to obtain a combined output current.

CITATION LIST

Patent Literature

Patent Literature 1: Japanese Patent No. 5832702

SUMMARY OF INVENTION

Technical Problem

When the output power is near a rating, the conventional resonance-type power transmission apparatus described above has good power conversion efficiency as current phases are uniform; however, when the output power is changed from near the rating, the power conversion efficiency decreases.

In view of the above-described situation, an object of the present invention is to provide a power conversion device that prevents power conversion efficiency from decreasing and maintains high efficiency even when an output power is changed from near a rating, and a method for controlling the power conversion device.

Technical Solution

In response to the above issue, according to an aspect of the present invention, a power conversion device and a method for controlling the power conversion device simultaneously change a switching frequency and a time ratio of a switching element so that the switching element satisfies a condition of zero-voltage switching when an output power of the power conversion device is changed.

Advantageous Effects

According to the present invention, even when the output power is changed from near the rating, the power conversion efficiency can be prevented from decreasing, and high efficiency can be maintained.

DESCRIPTION OF EMBODIMENTS

First Embodiment

Figure 1:
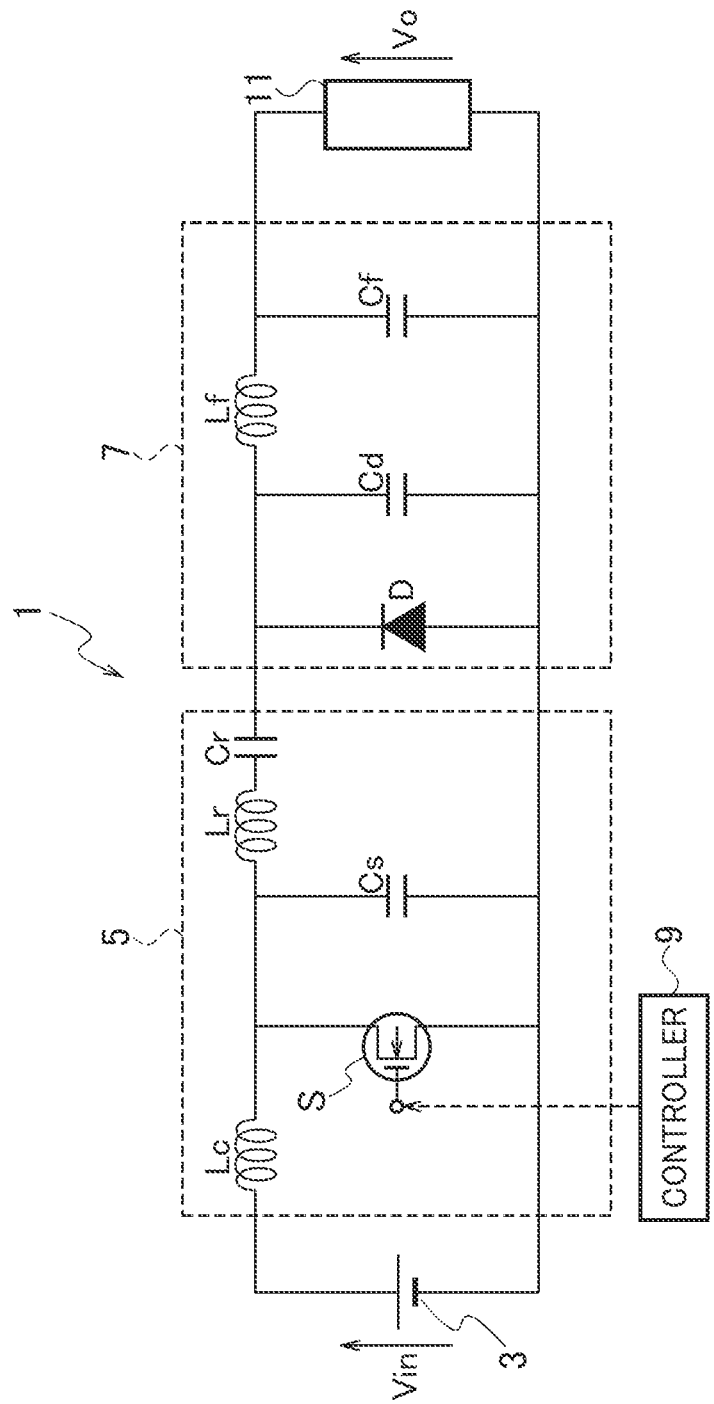
FIG. 1 is a circuit diagram illustrating a configuration of a power conversion device according to a first embodiment of the present invention.

A first embodiment to which the present invention is applied is described below with reference to the drawings. The same elements in the drawings are denoted by the same reference numerals, and description thereof is omitted.

[Configuration of Power Conversion Device]

FIG. 1 is a circuit diagram illustrating a configuration of a power conversion device according to the present embodiment. As illustrated in FIG. 1, the power conversion device 1 according to the present embodiment includes an input power supply 3, a voltage resonance circuit 5, a rectifier circuit 7, a controller 9, and a load 11. The power conversion device 1 is a DC/DC converter that converts DC power from the input power supply 3 into AC and supplies DC power rectified by the rectifier circuit 7 to the load 11.

The voltage resonance circuit 5 includes a choke coil Lc, a resonance coil Lr, a resonance capacitor Cr, a switching element S, and a shunt capacitor Cs. The voltage resonance circuit 5 is a class-E inverter circuit that converts DC power from the input power supply 3 into AC power by controlling on/off operation of the switching element S. The switching element S is described here in the case of a MOSFET as an example.

As illustrated in FIG. 1, the choke coil Lc is connected between the input power supply 3 and the switching element S. The resonance coil Lr and the resonance capacitor Cr are connected in series to form a resonance circuit, which is connected to a connection point between the choke coil Lc and the switching element S. The switching element S turns on and off the input to the resonance circuit, and the shunt capacitor Cs is connected in parallel to the switching element S.

The rectifier circuit 7 is a class-E rectifier, which includes a diode D, a rectifier capacitor Cd, a filter coil Lf, and a filter capacitor Cf and rectifies an AC wave output from the voltage resonance circuit 5 with a configuration in which the diode D and the rectifier capacitor Cd are connected in parallel.

The rectifier circuit 7 has the AC wave generated in the voltage resonance circuit 5 half-wave rectified by the diode D to have the rectified energy charged in the rectifier capacitor Cd. The rectifier circuit 7 then transfers the charged energy to an LC filter including the filter coil Lf and the filter capacitor Cf to transmit power to the load 11 as a DC waveform. Thus, while the voltage waveform of the rectifier capacitor Cd has a half-wave rectified shape, by passing it through the LC filter, the waveform of the voltage supplied to the load 11 becomes DC.

The controller 9 controls output power of the power conversion device 1 by switching a conduction state of the switching element S. Specifically, the controller 9 generates a drive signal for controlling on/off operation of the switching element S and outputs the drive signal to a control terminal of the switching element S.

Figure 2:
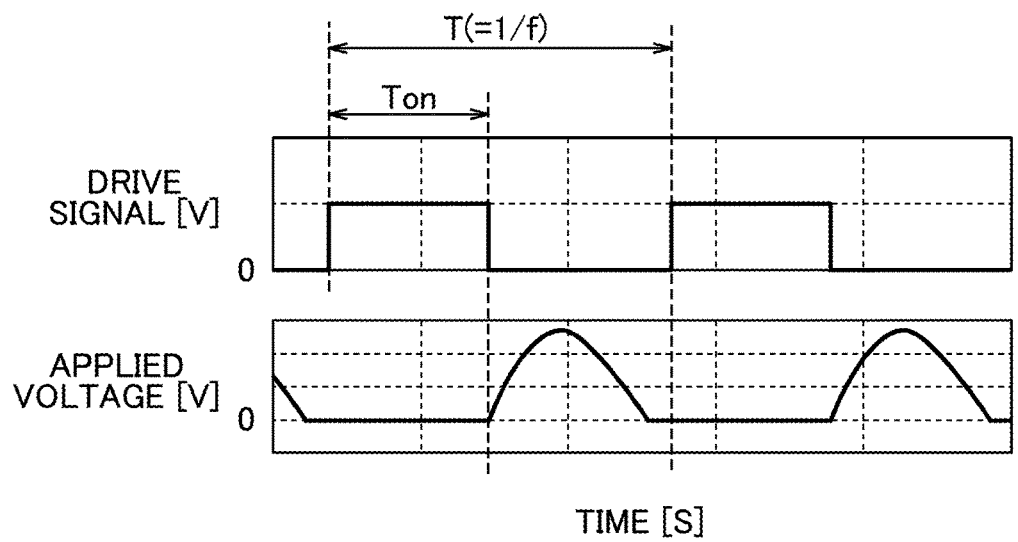
FIG. 2 is a diagram for explaining an operation of a switching element included in the power conversion device according to the first embodiment of the present invention.

Referring now to FIG. 2, control of the switching element S by the controller 9 is described. FIG. 2 illustrates time variation of the drive signal and an applied voltage to the switching element S. In FIG. 2, the horizontal axis represents time, and the vertical axis represents the drive signal for the switching element S and the applied voltage for the switching element S. The drive signal is a gate voltage output from the controller 9 to the gate of the switching element S, and the applied voltage is a drain-source voltage applied to the switching element S.

As illustrated in FIG. 2, the switching element S is not electrically connected while the drive signal is on, and when the drive signal is turned off, the switching element S is electrically connected, so that the voltage is applied thereto. The present embodiment is directed to a voltage resonance circuit in which the waveform of the voltage applied to the switching element S is a half-sinusoidal. Here, a switching frequency f of the drive signal is the inverse of one cycle T of the drive signal. A time ratio D is the ratio of on time $T_{on}$ to one cycle T and is defined as $D=T_{on}/T$. The controller 9 simultaneously changes the switching frequency f and the time ratio D to control the output power of the power conversion device 1.

The controller 9 includes a multi-purpose electronic circuit including microcomputer, a microprocessor, and a CPU, and a peripheral components, such as memory, and has a function of controlling the voltage resonance circuit 5. Each function of the controller 9 can be implemented in single or multiple processing circuits. The processing circuit includes a programmed processing device, such as a processing device including an electrical circuit, as well as a device, such as an application-specific integrated circuit (ASIC) configured to execute a function described in the embodiments and a conventional circuit component.

[Method for Controlling Power Conversion Device]

Next, a method for controlling the power conversion device 1 according to the present embodiment is described. In the present embodiment, when the output power is changed by changing an output voltage $V_O$ of the power conversion device 1, the switching frequency f and the time ratio D of the switching element S are simultaneously changed so that the switching element S satisfies a condition of zero-voltage switching.

The power conversion device 1 in FIG. 1 is a class-E2 converter circuit including the voltage resonance circuit 5 that is a class-E inverter circuit, and the rectifier circuit 7 that is a class-E rectifier. The ratio of an input voltage $V_{in}$ to the output voltage $V_O$ (input-output voltage ratio) of such a class-E2 converter circuit is expressed by the following equation (1):

$$\frac{v_o}{v_{in}} = \frac{1}{\pi}\sin\pi D \sin(\pi D + \varphi_s)\frac{1}{1-D} \sqrt{\frac{R_L}{\pi f L_r} \frac{2(1-D)^2\pi^2 - 1 + 2\cos\varphi_s\cos(2\pi D + \varphi_s) - \cos2(\pi D + \varphi_s)[\cos2\pi D - \pi(1-D)\sin2\pi D]}{B\sin\pi D\cos(\pi D + \varphi_s)\sin(\pi D + \varphi_s)[(1-D)\pi\cos\pi D + \sin\pi D]}} \quad (1)$$

Here, f is a switching frequency, D is a time ratio, Lr is an inductance of the resonance coil Lr, and RL is a resistance value of the load 11. Further, $\varphi_s$ is a phase difference between a drive signal for the switching element S and a current flowing through a series resonance circuit including the resonance coil Lr and the resonance capacitor Cr.

As given by equation (1), the input/output voltage ratio ($V_O/V_{in}$) varies according to the switching frequency f and the time ratio D. Since the input voltage $V_{in}$ of the input power supply 3 is constant, the output voltage $V_O$ is controlled by simultaneously changing the switching frequency f and the time ratio D. Therefore, when the output voltage $V_O$ is changed, the controller 9 simultaneously changes the switching frequency f and the time ratio D of the switching element S.

Further, the switching frequency f and the time ratio D that satisfy the condition of zero-voltage switching (ZVS), which is a feature of class-E circuits, is expressed by equation (2), where Cs is a capacitance of the shunt capacitor Cs:

$$f = \frac{1}{2\pi}\sqrt{\frac{2(1-D)^2\pi^2 - 1 + 2\cos\varphi_s\cos(2\pi D + \varphi_s) - \cos2(\pi D + \varphi_s)[\cos2\pi D - \pi(1-D)\sin2\pi D]}{2\pi^2(1-D)L_r c_s}} \quad (2)$$

Zero-voltage switching means turning the switching element S on or off after the voltage applied to the switching element S becomes 0 volts. When the switching frequency f and the time ratio D satisfy equation (2), zero-voltage switching is achieved in the class-E2 converter circuit in FIG. 1.

Thus, when the output voltage $V_O$ is changed, the controller 9 simultaneously changes the switching frequency f and the time ratio D of the switching element S so as to satisfy the condition of zero-voltage switching given by equation (2). For example, when the output voltage $V_O$ to be output is determined, since the input voltage $V_{in}$ is constant, the time ratio D is calculated by erasing the switching frequency f from equations (1) and (2), and the switching frequency f is also calculated using the time ratio D calculated. This enables the controller 9 to control the power conversion device 1 with the condition of zero-voltage switching achieved by setting the calculated switching frequency f and time ratio D even when the output voltage $V_O$ is changed.

Figure 3:
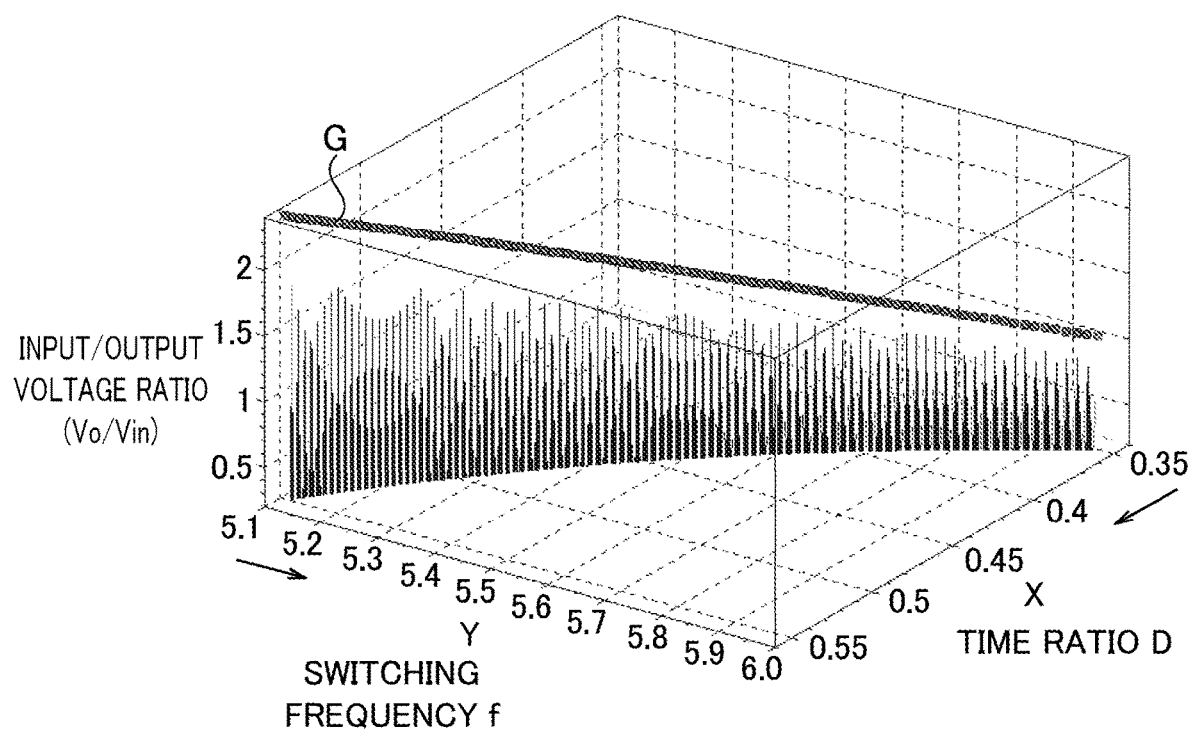
FIG. 3 is a diagram illustrating a characteristic of an input/output voltage ratio of the power conversion device according to the first embodiment of the present invention.

A method for simultaneously changing the switching frequency f and the time ratio D is described with reference to FIG. 3. FIG. 3 is a diagram illustrating the input-output voltage ratio ($V_O/V_{in}$) calculated by equation (1) when the switching frequency f and the time ratio D of the switching element S are changed under the condition satisfying equation (2). A line G is the input/output voltage ratio (input/output gain). That is, a point on the straight line G represents the switching frequency f and the time ratio D satisfying the condition of zero-voltage switching.

As illustrated in FIG. 3, when the output voltage $V_O$ applied to the load 11 is increased, the time ratio D should be increased at the same time as the switching frequency f is decreased, since the input voltage Vu is constant. In contrast, when the output voltage $V_O$ is decreased, the time ratio D is decreased at the same time as the switching frequency f is increased.

Figure 4:
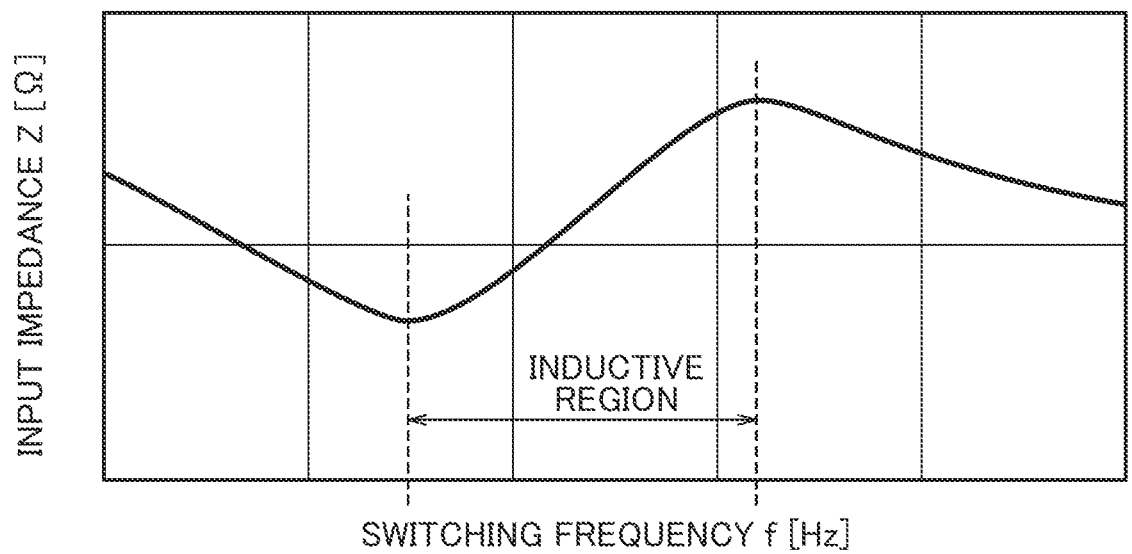
FIG. 4 is a diagram illustrating a characteristic of an input impedance of the power conversion device according to the first embodiment of the present invention.

Further, when satisfying equation (2), the power conversion device 1 according to the present embodiment also satisfies a condition that the operating point for driving the circuit in FIG. 1 is inductive. To illustrate this condition, FIG. 4 is referred. FIG. 4 is a diagram illustrating a frequency characteristic of an input impedance of the circuit in FIG. 1, in which the horizontal axis represents the switching frequency f, and the vertical axis represents an input impedance Z.

As illustrated in FIG. 4, the input impedance Z of the circuit in FIG. 1 varies according to the switching frequency f. For the circuit in FIG. 1 to satisfy the condition of zero-voltage switching, the operating point must be set in an inductive (lag phase) region in FIG. 4. The switching frequency f, which is calculated to satisfy the above-described equation (2) when the output voltage $V_O$ is changed, is thus located within the inductive region in FIG. 4.

Instead of calculating the switching frequency f using equation (2), a frequency within the inductive region in FIG. 4 may be selected as the switching frequency f, accordingly. Not all the frequencies within the inductive region satisfy equation (2); however, there is no problem when a frequency within the inductive region is selected, in consideration of a tolerance described later. Then, calculating the time ratio D from equation (2) using the switching frequency f selected, and setting the switching frequency f and the time ratio D achieve the power conversion device 1 capable of highly efficient operation with low switching loss.

The present embodiment is described with the DC/DC converter as an example as illustrated in FIG. 1 but is not limited to the DC/DC converter. Any other configuration may be employed as long as the power conversion device uses a class-E circuit. For example, an insulating transformer may be connected between the voltage resonance circuit 5 and the rectifier circuit 7. An input current source may be installed instead of the input power supply 3 and the choke coil Lc that serve as the voltage source. The rectifier circuit 7 may be a bridge-type full-wave rectifier circuit.

[Tolerance]

Next, a tolerance of the switching frequency f given by equation (2) is described. In the present embodiment, high efficiency operation with low switching loss is made possible by simultaneously changing the switching frequency f and the time ratio D so as to satisfy equation (2); however, equation (2) includes error factors such as circuit parameters.

Figure 5:
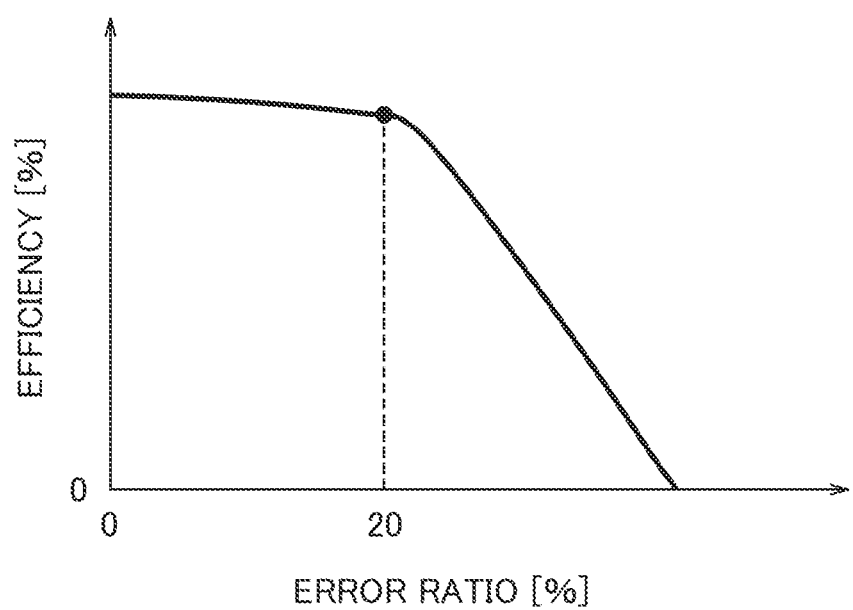
FIG. 5 is a diagram illustrating a relationship between efficiency and an error ratio of the power conversion device according to the first embodiment of the present invention.

It is thus not necessary to completely match with the switching frequency f calculated by equation (2), and high efficiency operation with low switching loss is enabled when within the range of ±20%. For example, FIG. 5 illustrates a relationship between an error ratio of the switching frequency f and efficiency of the circuit. The error ratio indicates a difference from the switching frequency f calculated by equation (2).

As illustrated in FIG. 5, when a frequency in the range within +20% from the switching frequency f calculated by equation (2) is used, the efficiency of the circuit hardly reduces. However, when the error ratio exceeds 20%, the efficiency rapidly deteriorates.

This means that a sudden drop in a Q value is reduced within a range of half-widths of two resonance points of the two resonance circuits included in the class E2 converter circuit in FIG. 1, namely the series resonance circuit and the parallel resonance circuit, and that the range is ±20%. That is, since zero-voltage switching is achieved within the range of half-widths of resonance points, low switching loss is achieved and the deterioration of efficiency is reduced. However, a load Q value (QL) of the inverter (voltage resonance circuit 5) included in the class E2 converter circuit requires a sinusoidal output, and thus QL>5.

Figure 6:
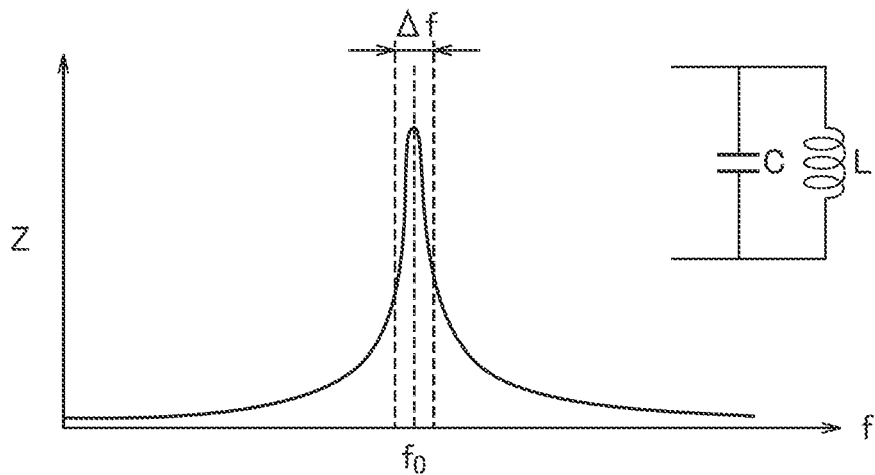
FIG. 6 is a diagram illustrating an impedance characteristic of a parallel resonance circuit.

The Q value is a quality factor of a coil forming the resonance point. FIG. 6 illustrates an impedance characteristic of the parallel resonance circuit where $f_0$ indicates a resonance frequency, and Δf indicates a half width. The resonance frequency $f_0$ is expressed by:

$$f_0 = \frac{1}{2\pi\sqrt{LC}} \quad (3)$$

The half width Δf is expressed by:

$$\Delta f = \frac{r}{2\pi L} \quad (4)$$

where L is an inductance of the coil, C is a capacitance of the capacitor, and r is a parasitic resistance of the coil.

Figure 7:
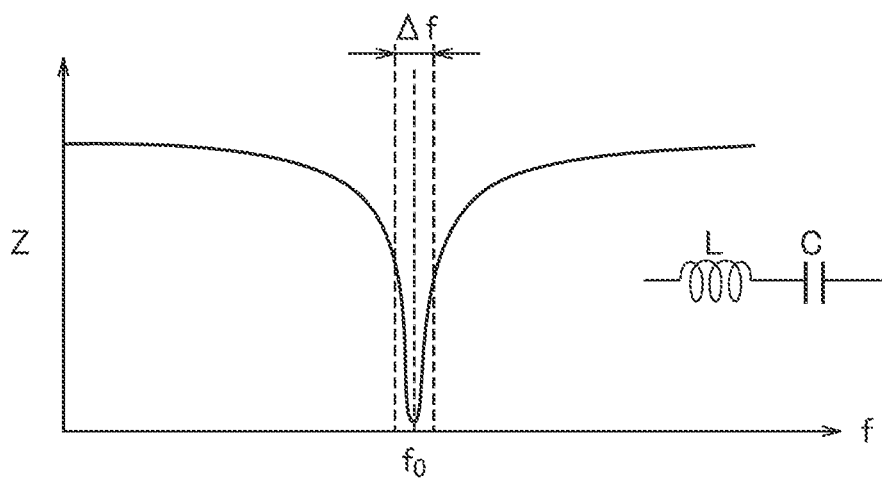
FIG. 7 is a diagram illustrating an impedance characteristic of a series resonance circuit.

As given by equation (4), when the loss of the coil is small and the parasitic resistance r of the coil is small, the half width becomes narrower and the resonance characteristic becomes sharp. FIG. 7 illustrates an impedance characteristic of the series resonance circuit (or anti-resonance circuit). Except for having a minimum value instead of a maximum value, the impedance characteristic has a characteristic similar to that of the parallel resonance circuit illustrated in FIG. 6.

The load Q value (QL) is the quality factor of the inductance with respect to the load and is expressed by:

$$QL = \frac{2\pi f \cdot L}{R_L} \quad (5)$$

where RL is an equivalent resistance value of the load, f is a switching frequency, and L is an inductance of the resonance coil Lr. Therefore, QL>5 is a necessary condition for the current flowing in the resonance coil Lr to be sinusoidal.

Effect of First Embodiment

As described above in detail, the power conversion device 1 according to the present embodiment simultaneously changes the switching frequency f and the time ratio D of the switching element S so that the switching element S satisfies the condition of zero-voltage switching when the output power is changed. Thus, when the output power is changed over a wide range from near a rating, the switching loss can be reduced, thereby preventing a decrease in power conversion efficiency and maintaining a highly efficient state. Further, since there is no need to provide an additional circuit, the apparatus is prevented from becoming large in size.

Figure 8:
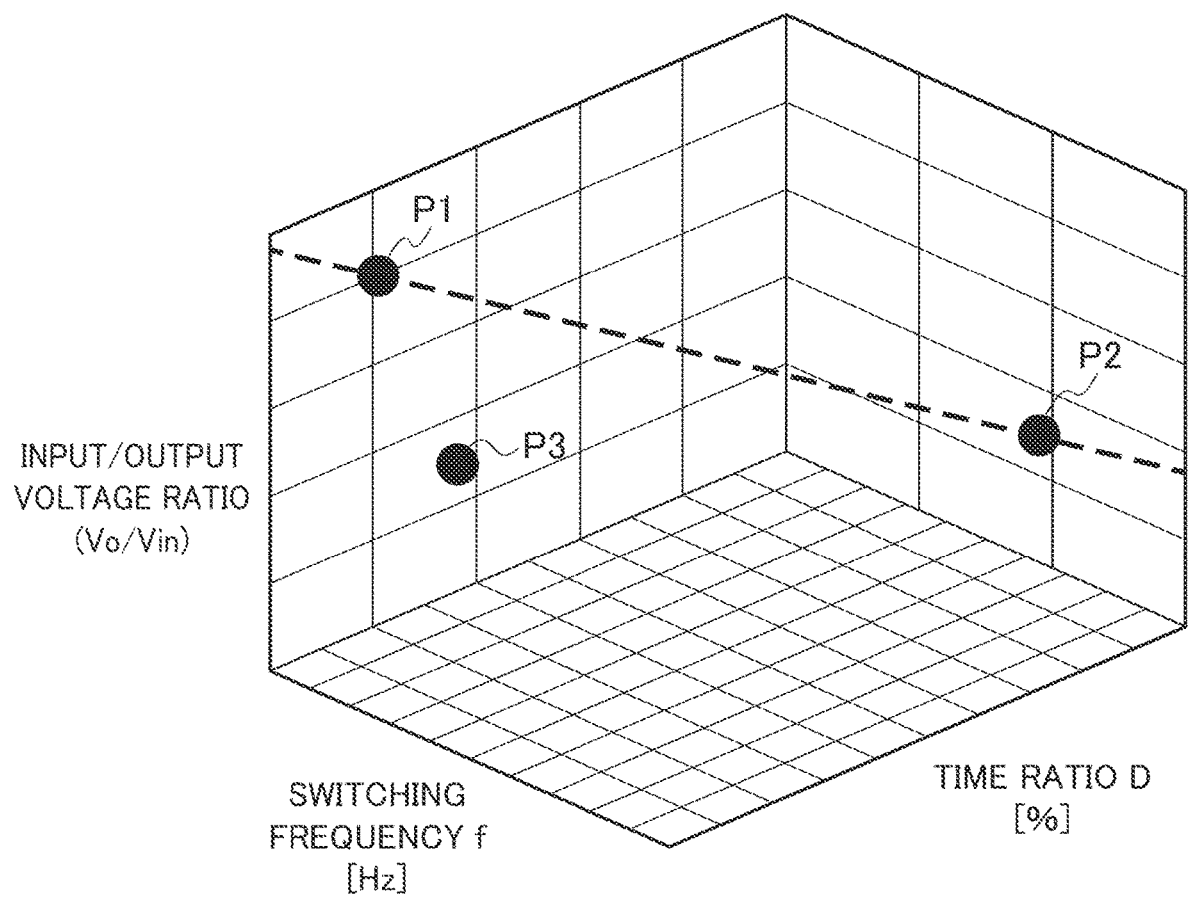
FIG. 8 is a diagram illustrating a characteristic of an input/output voltage ratio of the power conversion device according to the first embodiment of the present invention.

Referring now to FIGS. 8 to 11, the effect of the power conversion device 1 according to the present embodiment is specifically described. FIG. 8 is a diagram illustrating an input/output voltage ratio ($V_o/V_{in}$) calculated by equation (1) when the switching frequency f and the time ratio D of the switching element S are changed under the condition satisfying equation (2). A dotted line in the figure is the input/output voltage ratio satisfying the condition of zero-voltage switching by satisfying equation (2).

Figure 9:
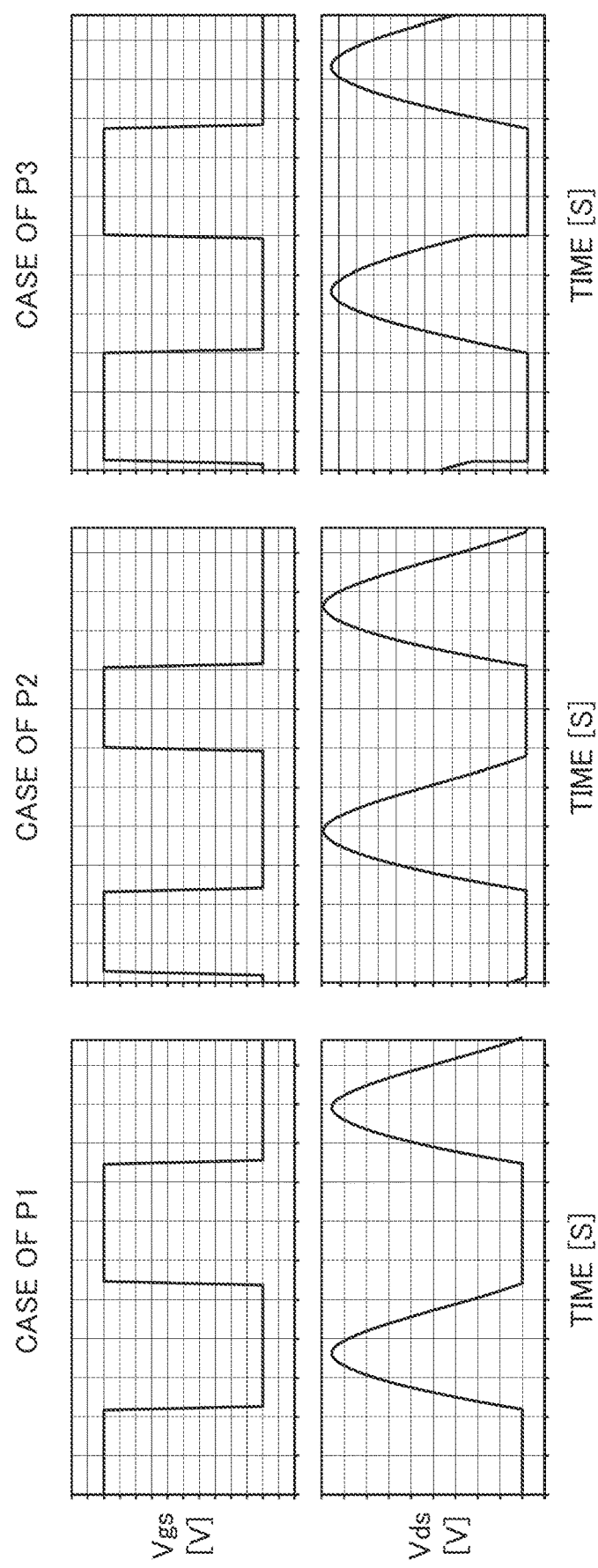
FIG. 9 is a diagram for explaining an operation of the switching element included in the power conversion device according to the first embodiment of the present invention.

FIG. 9 illustrates waveforms at three points (P1, P2, P3) in FIG. 8, where the horizontal axis of the waveforms represents time, the upper part of the vertical axis represents a gate signal (Vgs) for the switching element S, and the lower part of the vertical axis represents a drain-source voltage (Vds) for the switching element S. P1 and P2 are on the dotted line, satisfying equation (2), and it is seen that waveforms thereof in FIG. 9 satisfy the condition of zero-voltage switching. That is, the gate voltage Vgs is applied at a timing when the voltage Vds applied to the switching element S drops to 0 volts. In contrast, P3 is not on the dotted line, not satisfying equation (2), and it is seen that the waveform thereof in FIG. 9 does not satisfy the condition of zero-voltage switching. That is, the gate voltage Vgs is applied at a timing when the voltage Vds applied to the switching element S is not lowered to 0 volts.

Thus, the power conversion device 1 according to the present embodiment simultaneously changes the switching frequency f and the time ratio D of the switching element S so that the switching element S satisfies the condition of zero-voltage switching when the output power is changed. Consequently, when the output power is changed over a wide range from near the rating, the switching loss can be reduced, thereby preventing a decrease in power conversion efficiency and maintaining a highly efficient state.

Figure 10:
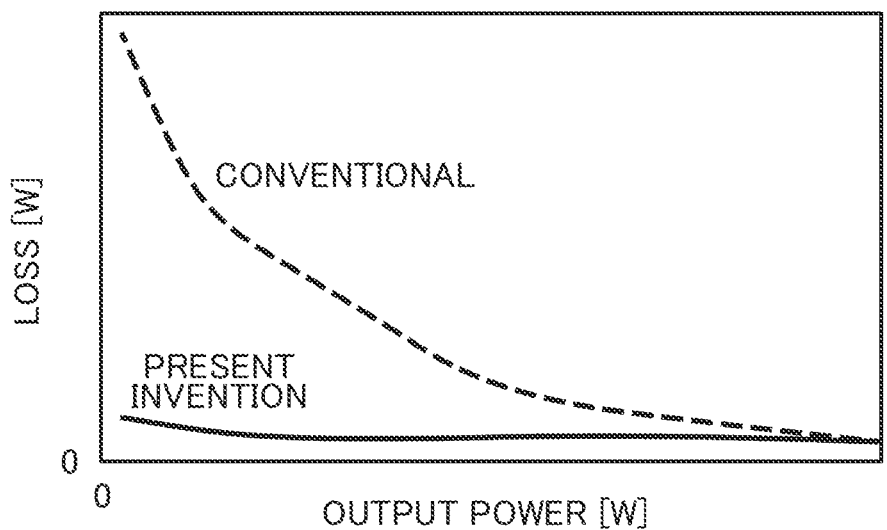
FIG. 10 is a diagram for explaining an effect of the power conversion device according to the first embodiment of the present invention.
Figure 11:
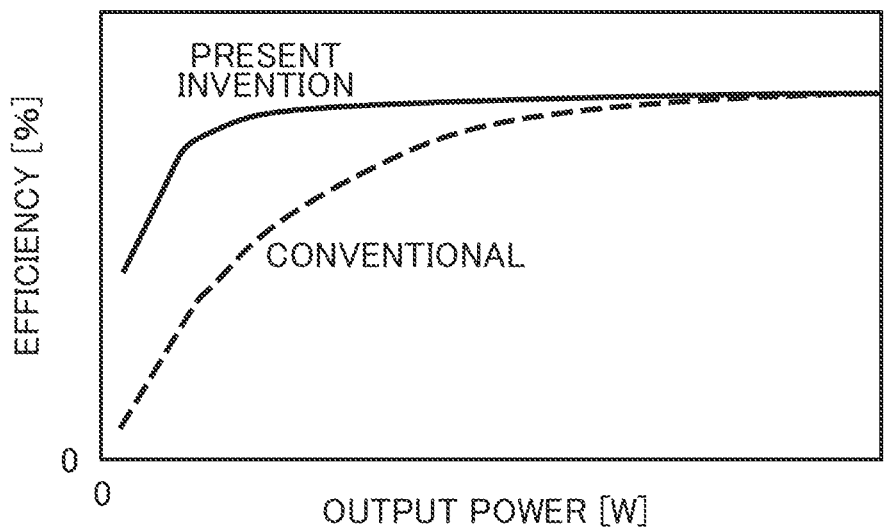
FIG. 11 is a diagram for explaining an effect of the power conversion device according to the first embodiment of the present invention.

Referring to FIGS. 10 and 11, it is specifically described below that the power conversion device 1 according to the present embodiment can reduce the switching loss and maintain high efficiency. FIG. 10 illustrates a loss characteristic with respect to the output power of the power conversion device 1 according to the present embodiment. FIG. 11 illustrates an efficiency characteristic with respect to the output power of the power conversion device 1 according to the present embodiment.

First, as illustrated in FIG. 10, a dotted line of the loss characteristic of the conventional class-E circuit indicates that the loss is low near the maximum output power, that is, near the rating, but increases as the output power decreases. As a result, as illustrated in FIG. 11, a dotted line of the efficiency characteristic of the conventional class-E circuit also indicates that the efficiency is high near the maximum output power, that is, near the rating, but decreases as the output power decreases. This is because the conventional class-E circuit also achieves zero-voltage switching, which is the class-E operation, near the rating, but cannot achieve zero-voltage switching when the output power is changed, resulting in worsening of switching loss and reduction in efficiency.

In contrast, the power conversion device 1 according to the present embodiment simultaneously changes the switching frequency f and the time ratio D so as to satisfy the condition of zero-voltage switching. Therefore, as illustrated by solid lines in FIGS. 10 and 11, even when the output power is changed, low switching loss and high efficiency are achieved. That is, compared with the conventional class-E circuit, low switching loss is achieved, and the highly efficient state is maintained in a wide output power range.

In the power conversion device 1 according to the present embodiment, when the output power of the power conversion device 1 is increased, the time ratio D is increased at the same time as the switching frequency f is decreased. Thus, the condition of zero-voltage switching can be satisfied even when the output power is increased, thereby reducing the switching loss and maintaining the highly efficient state.

Further, in the power conversion device 1 according to the present embodiment, when the output power of the power conversion device 1 is reduced, the time ratio D is reduced at the same time as the switching frequency f is increased. Thus, the condition of zero-voltage switching can be satisfied even when the output power is reduced, thereby reducing the switching loss and maintaining the highly efficient state.

The power conversion device 1 according to the present embodiment simultaneously changes the switching frequency f and the time ratio D so that the switching frequency f and the time ratio D satisfy equation (2). Thus, the power conversion device 1 operates in a state satisfying the condition of zero-voltage switching, and even when the output power is changed over a wide range, the switching loss can be reduced, and the highly efficient state can be maintained.

The power conversion device 1 according to the present embodiment includes the DC/DC converter with the class-E inverter. This specifically achieves a circuit with low switching loss and high efficiency and particularly achieves miniaturization and cost reduction of the circuit.

Second Embodiment

A second embodiment to which the present invention is applied is described below with reference to the drawings. The configuration of the power conversion device 1 according to the present embodiment is the same as that according to the first embodiment in FIG. 1.

[Method for Controlling Power Conversion Device]

A method for controlling the power conversion device 1 according to the present embodiment is described. In the first embodiment, the relationship between the switching frequency f and the time ratio D satisfying the condition of zero-voltage switching, which is a feature of the class-E circuit, is expressed by equation (2). The present embodiment differs from the first embodiment in that equation (2) is simplified.

In the present embodiment, in the class-E circuit, an input impedance Zds of the switching element S is converted into a mathematical expression, and the operating point determined by equation (2) is arranged on the Laplace plane to simplify the mathematical expression. The input impedance Zds of the switching element S is expressed by the following equation (6).

$$Z_{ds} = \frac{L_1 s(C_r L_r s^2 + C_r R_{ac} s + 1)}{C_1 C_r L_1 L_r s^4 + C_1 C_r R_{ac} s^3 + (C_1 L_1 + C_r L_1 + C_r L_r)s^2 + C_r R_{ac} s + 1} \quad (6)$$

Figure 12:
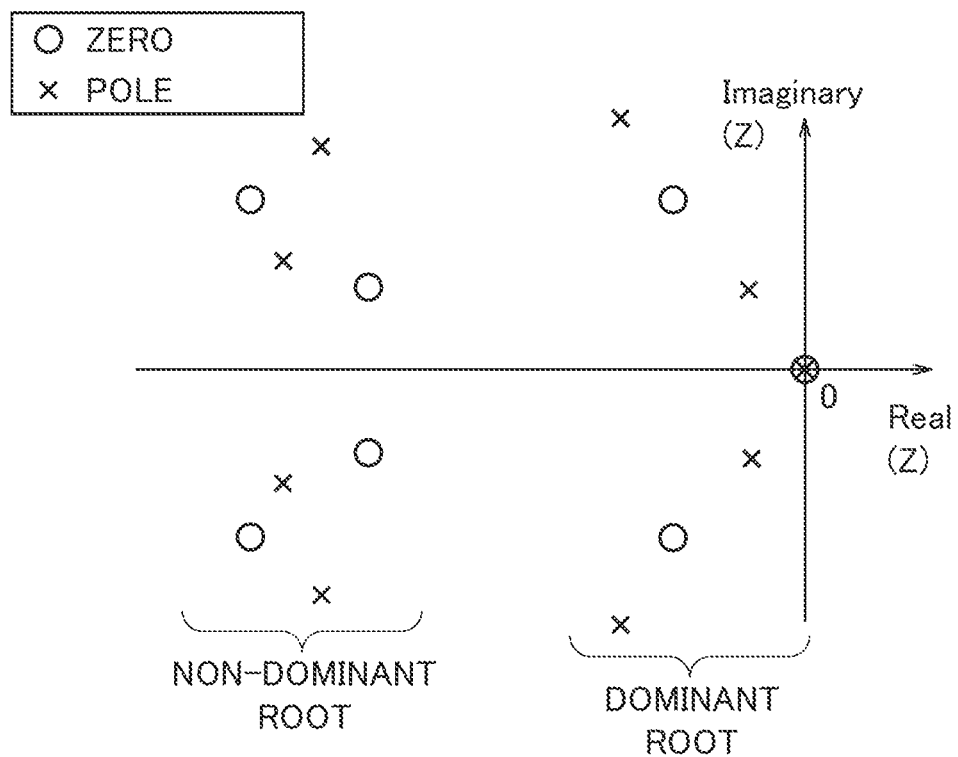
FIG. 12 is a diagram for explaining simplification of arithmetic processing in a power conversion device according to a second embodiment of the present invention.

FIG. 12 is a pole/zero map with poles and zeros of the impedance on the Laplace plane. To simplify equation (2), pole assignment of the impedance Zds is important so that the operating point on the Laplace plane satisfies the condition of zero-voltage switching. As illustrated in FIG. 12, among the poles and zeros of the left half-plane, poles and zeros close to the imaginary axis are dominant roots (poles and zeros) in circuit operation, and poles and zeros far from the imaginary axis are non-dominant roots (poles and zeros) in circuit operation. Equation (2) is simplified to equation (7) by simplifying poles and zeros of the positive area of the imaginary axis in the left half plane on the Laplace plane by performing weight analysis using the positive and negative symmetry of the imaginary axis. That is, the approximate equation in the vicinity of the operating point was found to simplify the calculation by confirming the regularity through experiments.

$$f \cdot D = \alpha P^\beta = \alpha \left( \frac{V_o^2}{RL} \right)^\beta \qquad (7)$$

In equation (7), $\alpha$ and $\beta$ are constants determined by parameters of the circuit satisfying the condition of zero-voltage switching. That is, they are constants determined by specifications of the circuit, such as a power rating or an input/output voltage, and are known information. P represents the output power, which is expressed as $P=V_o^2/RL$. RL is an equivalent load resistance value of the load 11, and RL is known information, so that the output voltage $V_O$ is controlled by equations (1) and (7) by simultaneously changing the switching frequency f and the time ratio D.

As described above, in the present embodiment, the condition of zero-voltage switching expressed by equation (2) is simplified, and as given by equation (7), the product of the switching frequency f and the time ratio D is expressed by an exponential function of the output voltage $V_O$. Therefore, in the present embodiment, the switching frequency f and the time ratio D are simultaneously changed so that the product of the switching frequency f and the time ratio D satisfies the exponential function of the output voltage $V_O$ of the power conversion device 1.

Equation (7) expresses the product of the switching frequency f and the time ratio D also as a function of the resistance value of the load 11. Therefore, in the present embodiment, the switching frequency f and the time ratio D are simultaneously changed so that the product of the switching frequency f and the time ratio D satisfies a function of a resistance value RL of the load 11. The controller 9 detects the resistance value RL of the load 11 and inputs the resistance value RL and the output voltage $V_O$ to be output to equation (7), thereby obtaining the product of the switching frequency f and the time ratio D. For example, when the load 11 is a battery, the resistance value RL is obtained by detecting the voltage and current of the load 11.

[Tolerance]

Next, a tolerance of the switching frequency f when equation (7) is used is described. In the present embodiment, the switching frequency f and the time ratio D are simultaneously changed so as to satisfy equation (7), thereby achieving highly efficient operation with low switching loss. However, equation (7) includes an error factor due to approximation.

Figure 13:
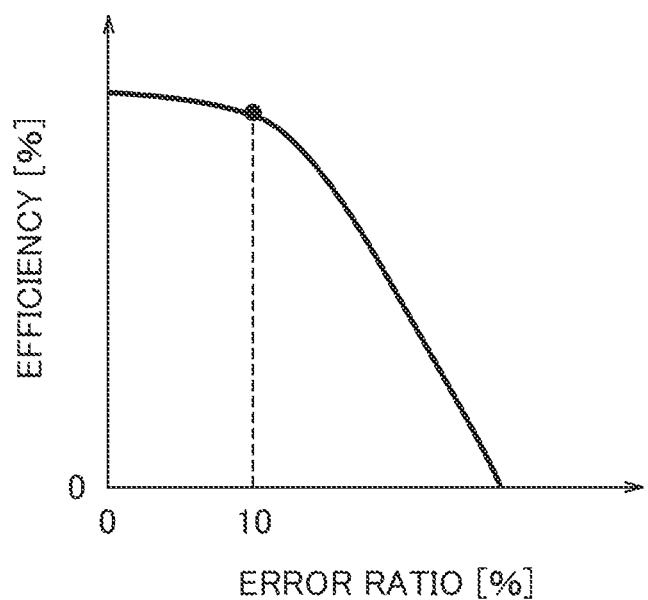
FIG. 13 is a diagram illustrating a relationship between efficiency and an error ratio of the power conversion device according to the second embodiment of the present invention.

It is thus not necessary to completely match with the switching frequency f calculated by equation (7), and when it is within a range of ±10%, high-efficiency operation with low switching loss is possible. For example, FIG. 13 illustrates a relationship between an error ratio of the switching frequency f and efficiency of the circuit. The error ratio is a difference from the switching frequency f calculated by equation (7).

As illustrated in FIG. 13, when a frequency in a range within ±10% from the switching frequency f calculated by equation (7) is used, the efficiency of the circuit hardly decreases. However, when the error ratio exceeds 10%, the efficiency rapidly deteriorates.

This is because equation (7) is an approximation of equation (2), and the dominant roots of equation (2) are approximated. In the case of equation (2), the error ratio was due to the half-width of the resonance point, whereas in equation (7), an error due to approximation is added in addition to the error in equation (2). Therefore, the tolerance in the case of equation (2) is ±20% as illustrated in FIG. 5, but the tolerance in the case of equation (7) is narrowed to ±10%.

Effect of Second Embodiment

As described above, the power conversion device 1 according to the present embodiment simultaneously changes the switching frequency f and the time ratio D so that the product of the switching frequency f and the time ratio D satisfies equation (7). This can simplify the arithmetic processing, thereby achieving the power conversion device at high speed and low cost.

Figure 14:
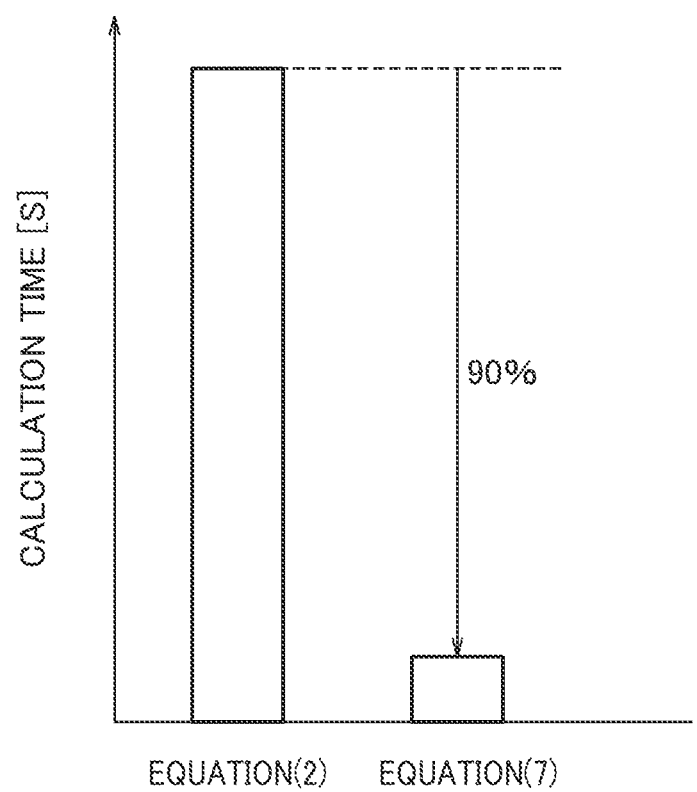
FIG. 14 is a diagram for explaining an effect of the power conversion device according to the second embodiment of the present invention.

For example, as illustrated in FIG. 14, compared to the case of calculating the switching frequency f and the time ratio D using equation (2), the calculation time is reduced by 90% in the case of calculating them using equation (7).

Thus, using equation (7) enables the switching frequency f and the time ratio D to be calculated more simply than using equation (2). In particular, the reduction of the calculation time is important for a circuit operating at a high frequency, and using equation (7) can make the circuit faster and more compact. This also reduces the cost of DSP (Digital Signal Processor) and FPGA (field-programmable gate array) for controlling the switching element S.

Moreover, the power conversion device 1 according to the present embodiment simultaneously changes the switching frequency f and the time ratio D so that the product of the switching frequency f and the time ratio D satisfies an exponential function of the output voltage of the power conversion device 1. This can simplify the arithmetic processing, thereby achieving a high-speed and low-cost power conversion device.

Further, the power conversion device 1 according to the present embodiment simultaneously changes the switching frequency f and the time ratio D so that the product of the switching frequency f and the time ratio D satisfies a function of the resistance value of the load 11 connected to the power conversion device 1. This can simplify the arithmetic processing, thereby achieving a high-speed and low-cost power conversion device.

The embodiments described above are examples of the present invention. It should be understood that the present invention is not intended to be limited to these embodiments, and various modification can be made, in addition to the embodiments described above, depending on the design without departing from the scope of the technical idea of the present invention.

REFERENCE SIGNS LIST

1 Power conversion device
3 Input power supply

5 Voltage resonance circuit
7 Rectifier circuit
9 Controller
11 Load
Lc Choke coil
Lr Resonance coil
Cr Resonance capacitor
S Switching element
Cs Shunt capacitor
D Diode
Cd Rectifier capacitor
Lf Filter coil
Cf Filter capacitor

The invention claimed is:

1. A method for controlling a power conversion device for converting power from a power supply by controlling an input to a resonance circuit comprising a resonance coil and a resonance capacitor, with a switching element, the method comprising:
simultaneously changing a switching frequency and a time ratio of the switching element so that the switching element satisfies a condition of zero-voltage switching when an output power of the power conversion device is changed,
wherein the switching frequency is set so as to be located within an inductive region where impedance of the resonance circuit is inductive, and
wherein the condition of zero-voltage switching is one of an exponential function of the output voltage of the power conversion device or a function of a resistance value of a load connected to the power conversion device.

2. The method for controlling the power conversion device according to claim 1, further comprising:
increasing the time ratio at the same time as decreasing the switching frequency when the output power of the power conversion device is increased.

3. The method for controlling the power conversion device according to claim 1, further comprising:
decreasing the time ratio at the same time as increasing the switching frequency when the output power of the power conversion device is decreased.

4. The method for controlling the power conversion device according to claim 1, further comprising:
simultaneously changing the switching frequency and the time ratio so that a product of the switching frequency and the time ratio satisfies:

$$f \cdot D = \alpha \left( \frac{Vo^2}{RL} \right)^\beta \tag{8}$$

where the switching frequency is f, the time ratio is D, an output voltage of the power conversion device is $V_o$, the resistance value of a load connected to the power conversion device is RL, and $\alpha$, and $\beta$ are constants.

5. The method for controlling the power conversion device according to claim 1, further comprising:
simultaneously changing the switching frequency and the time ratio so that the switching frequency and the time ratio satisfy:

$$f = \frac{1}{2\pi} \sqrt{\frac{2(1-D)^2\pi^2 - 1 + 2\cos\varphi_s\cos(2\pi D + \varphi_s) - \cos2(\pi D + \varphi_s)[\cos2\pi D - \pi(1-D)\sin2\pi D]}{2\pi^2(1-D)L_r C_s}} \tag{9}$$

where the switching frequency is f, the time ratio is D, an inductance of the resonance coil is Lr, a capacitance of a shunt capacitor connected in parallel with the switching element is Cs, and a phase difference between a drive signal for the switching element and a current flowing in the resonance circuit is $\varphi$s.

6. The method for controlling the power conversion device according to claim 1, wherein the power conversion device is a DC/DC converter including a class-E inverter.

7. A power conversion device for converting power from a power supply by controlling an input to a resonance circuit comprising a resonance coil and a resonance capacitor, with a switching element, the power conversion device comprising:
a controller configured to simultaneously change a switching frequency and a time ratio of the switching element so that the switching element satisfies a condition of zero-voltage switching when an output power of the power conversion device is changed,
wherein the switching frequency is set so as to be located within an inductive region where impedance of the resonance circuit is inductive, and
wherein the condition of zero-voltage switching is one of an exponential function of the output voltage of the power conversion device or a function of a resistance value of a load connected to the power conversion device.

* * * * *